(12) United States Patent
Byrne

(10) Patent No.: US 11,129,101 B2
(45) Date of Patent: Sep. 21, 2021

(54) CENTRAL RADIO COORDINATION MAP

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/456,713

(22) Filed: Jun. 28, 2019

(65) Prior Publication Data

US 2020/0413339 A1   Dec. 31, 2020

(51) Int. Cl.
*H04W 52/02* (2009.01)
*H04W 8/02* (2009.01)
*H04W 64/00* (2009.01)
*H04W 4/50* (2018.01)

(52) U.S. Cl.
CPC ......... *H04W 52/0229* (2013.01); *H04W 4/50* (2018.02); *H04W 8/02* (2013.01); *H04W 64/006* (2013.01)

(58) Field of Classification Search
CPC . H04W 52/0229; H04W 64/006; H04W 4/50; H04W 8/02
See application file for complete search history.

(56) References Cited

U.S. PATENT DOCUMENTS

| | | | | |
|---|---|---|---|---|
| 7,142,882 B2* | 11/2006 | Schmidt | ................ | H04M 1/725 455/552.1 |
| 7,277,710 B1* | 10/2007 | Jones | .................... | H04W 48/08 455/433 |
| 7,386,237 B1* | 6/2008 | Compton | ................ | G01V 8/12 250/221 |
| 10,750,343 B2* | 8/2020 | Baer | ....................... | H04W 4/90 |
| 2006/0143098 A1* | 6/2006 | Lazaridis | .............. | H04M 15/00 705/34 |
| 2010/0124934 A1* | 5/2010 | Mach | .................... | H04W 24/02 455/456.1 |

(Continued)

FOREIGN PATENT DOCUMENTS

| | | | | | |
|---|---|---|---|---|---|
| CN | 102224745 A | * | 10/2011 | ............ | H04W 24/02 |
| CN | 1640163 B | * | 6/2012 | ........ | H04W 52/0216 |

(Continued)

*Primary Examiner* — Charles T Shedrick
(74) *Attorney, Agent, or Firm* — Brownstein Hyatt Farber Schreck, LLP

(57) ABSTRACT

Disclosed herein are methods and mobile telecommunication devices configured to operate within a cellular telecommunication network using multiple wireless communication services or technologies. Methods may include obtaining, by a mobile telecommunication device, its current location. The mobile telecommunication device may then determine, such as from a stored record or from an internet or telecommunication network link, which particular wireless communication services are available in a local area of the cellular telecommunication network. The mobile telecommunication device may then modify operation of its transceiver equipment for the wireless communication services, such as by activating the transceiver equipment if the wireless communication service is available, or reducing power usage, such as beaconing, for a wireless communication service that is not available.

19 Claims, 9 Drawing Sheets

(56) References Cited

U.S. PATENT DOCUMENTS

| | | | | |
|---|---|---|---|---|
| 2011/0294502 A1* | 12/2011 | Oerton | ................... | H04W 4/50 |
| | | | | 455/426.1 |
| 2013/0007853 A1* | 1/2013 | Gupta | ................ | H04L 63/0823 |
| | | | | 726/5 |
| 2015/0334646 A1* | 11/2015 | Buckley | ............... | H04W 48/18 |
| | | | | 455/432.1 |
| 2016/0057661 A1* | 2/2016 | Nayak | .................. | H04W 8/183 |
| | | | | 370/331 |
| 2018/0115170 A1* | 4/2018 | Bacarella | .............. | H02J 7/0027 |
| 2019/0143967 A1* | 5/2019 | Kutila | ................. | G05D 1/0257 |
| | | | | 701/23 |

FOREIGN PATENT DOCUMENTS

| | | | | |
|---|---|---|---|---|
| CN | 110516621 A | * | 11/2019 | ......... G01S 13/9041 |
| EP | 2192384 A1 | * | 6/2010 | ........... G05D 1/0253 |
| JP | 2012222777 A | * | 11/2012 | ............ H04W 36/14 |
| WO | WO-9417606 A1 | * | 8/1994 | ........ H04W 52/0274 |
| WO | WO-2015158434 A1 | * | 10/2015 | ............ H04W 76/10 |

\* cited by examiner

CENTRAL RADIO COORDINATION MAP

FIELD

The present disclosure generally relates to mobile communication devices, such as mobile cell phones, and methods of their operation. The methods relate to operation of such mobile communication devices in cellular networks.

BACKGROUND

Mobile electronic devices are commonplace in today's society. Example mobile electronic devices include mobile phones, tablet computers, laptop computers, electronic watches, and other types of mobile electronic devices. Mobile electronic devices may be equipped to form a physical or wired communication link to other electronic devices, either fixed or mobile. Mobile electronic devices may also be equipped with internal equipment or components that allow the mobile electronic devices to communicate using radio or other wireless technologies with other similarly equipped electronic devices, with cellular networks operated by telecommunication providers, with web servers, or with devices connected to various other types of networks. Herein, such equipped mobile electronic devices will be referred to as mobile telecommunication devices. Communications with or between such mobile telecommunication devices may be carried over a variety of wireless networks, using a variety of technologies.

Examples of wireless technologies include WiFi and WiMax, cellular telecommunication network technologies, and others. Mobile telecommunication devices may be equipped to connect wirelessly to cellular telecommunication networks operated by telecommunication providers. In one application, a cellular telecommunication network may provide a mobile telecommunication device with a telecommunication link to another electronic communication device, either mobile or fixed, such as for voice communication between respective users. In another application, a cellular telecommunication network may provide a mobile telecommunication device with a telecommunication link to access the internet, such as for data transfer.

Cellular communication networks may operate using multiple base station transceivers to provide respective wireless telecommunication links with multiple mobile telecommunication devices over an extended geographical area. A base station transceiver may establish and maintain wired or satellite communication links with core, circuit-switched, or packet-switched networks. A set of one or more base station transceivers (e.g., three base station transceivers) mounted on a tower and positioned to provide radio access for mobile telecommunication devices within an angular extent about the tower (and in some cases, within an angular extent of 360° about the tower) may define a cell of a radio access network. When a cell is defined by multiple base station transceivers, each base station transceiver within the cell may define a sector of the cell. Alternatively, each sector may be considered a cell. As a mobile telecommunication device moves from one cell to another cell, the mobile telecommunication device's network connection(s) may be transferred (e.g., handed off) from a base station transceiver in one cell to a base station transceiver in another cell.

Technological advances have created multiple generations of cellular telecommunication technologies. For example, "3G" technologies (e.g., CDMA2000, UMTS/EDGE) for cellular networks make use of packet-switching for data transmission and circuit switching for voice communications. Subsequent "4G" network technologies (e.g., LTE) may use just packet switching for voice and data. More recently, "5G" networks, using smaller cell topographies, are emerging. Unfortunately, not all of the various technologies are interoperable. As a result, cell phone handsets may be made using multiple transceivers. To connect with cellular towers (or other cellular network antennae technologies), a cellphone handset's transceivers may send out beacon signals in order to determine availability of service for its respective technology. For a cell phone handset including multiple transceivers, such beacon signaling may contribute to reducing battery charge at a rate unacceptable to consumers.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

The present disclosure is directed to mobile telecommunication devices, and methods of their operation, that connect with cellular telecommunication networks. Some examples of such mobile telecommunication devices (MTDs) include cellphone handsets, smart watches, laptop computers, wearable radio communication health monitors, and others.

More specifically, described herein is a method of operation of a mobile telecommunication device (MTD) within a cellular telecommunication network. The method includes obtaining, by the MTD, a current location of the MTD. The MTD may then access a record of wireless communication services, and, based on the record, select a wireless communication service that is available in a local area of its current location. The MTD may then activate a wireless transceiver configured to operate with the selected wireless communication service. The MTD may use the activated wireless transceiver to establish a telecommunication link via the wireless communication service between the MTD and the cellular telecommunication network.

The MTD may obtain its current location by using a Global Positioning System receiver. The record of wireless communication services may be stored on the MTD, and may provide a listing of wireless communication services available in the local area of the MTD. The MTD may use the established telecommunication link to access a storage site separate from the MTD, obtain an updated record of wireless communication services from the storage site, and store the updated record of wireless communication services on the MTD.

The MTD may include a second wireless transceiver, and may identify, based on the record of wireless communication services, a second wireless communication service within the local area of the current location of the MTD. The MTD may activate a second wireless transceiver of the MTD configured to operate with the second wireless communication service. Using the second wireless transceiver, the MTD may establish a second telecommunication link on the second wireless communication service between the MTD and the cellular telecommunication network.

The method of operation may also include monitoring movement of the MTD, and determining that the MTD has moved from the local area into an alternate area. The MTD may identify a second wireless communication service available in the alternate area, activate a second wireless transceiver, and use the second wireless transceiver to establish a second telecommunication link via the second wireless communication service between the MTD and the cellular telecommunication network.

The MTD may determine that the MTD has moved into a second alternate area. The MTD may determine, based on the record, that the second wireless communication service is not available in the second alternate area, and deactivate the second wireless transceiver on the MTD. Alternatively, the MTD may continue to operate the second wireless transceiver using beacon signaling to determine if or when the second wireless communication service becomes available. The MTD may update its record of wireless communication services accordingly.

Also described is an electronic device that includes a wireless transceiver configured to operate with at least one wireless communication service, a processor communicatively linked to the wireless transceiver, and a non-transitory storage medium communicatively linked with the processor. The storage medium may store a record of wireless communication services and instructions which, when executed by the processor, cause the processor to implement all or parts of the method of operation just described or now to be described. The electronic device may include a Global Positioning System to obtain a current location of the electronic device. The record of wireless communication services may be stored in the non-transitory storage medium.

The electronic device may include a second wireless transceiver that may be used to establish a second telecommunication link on a second wireless communication service between the electronic device and the cellular telecommunication network using the second wireless transceiver. The electronic device may monitor its movement, and activate the second wireless transceiver when the electronic device has moved into an alternate area in which the second wireless communication service is available to establish the second telecommunication link.

The electronic device may determine that the electronic device has moved into a second alternate area, determine that the second wireless communication service is not available in the second alternate area by accessing the record of wireless communication services, and deactivate the second wireless transceiver.

Also disclosed is a method of operating a mobile telecommunication device (MTD) that includes a first wireless transceiver and a second wireless transceiver. The method may include activating the first wireless transceiver and using the activated first wireless transceiver to establish a first telecommunication link via a first wireless communication service between the MTD and a cellular telecommunication network. The method may include obtaining a current location of the MTD, and identifying a second wireless communication service available in a local area of the current location. The method may include activating the second wireless transceiver and establishing a second telecommunication link on the second wireless communication service between the MTD and the cellular telecommunication network using the activated second wireless transceiver.

The current location of the MTD may be obtained using a signal from the cellular telecommunication network on the first telecommunication link. Identifying a second wireless communication service available in a local area of the current location may include accessing a record of wireless communication services obtained using a signal from the cellular telecommunication network on the first telecommunication link. The record of wireless communication services may provide a listing of wireless communication services available in the local area of the MTD.

The method may include monitoring movement of the MTD, determining that the MTD has moved from the local area into an alternate area, determining that the second wireless communication service is not available in the alternate area, and deactivating the second wireless transceiver on the MTD.

BRIEF DESCRIPTION OF THE DRAWINGS

The disclosure will be readily understood by the following detailed description in conjunction with the accompanying drawings, wherein like reference numerals designate like structural elements.

Figure 1A:
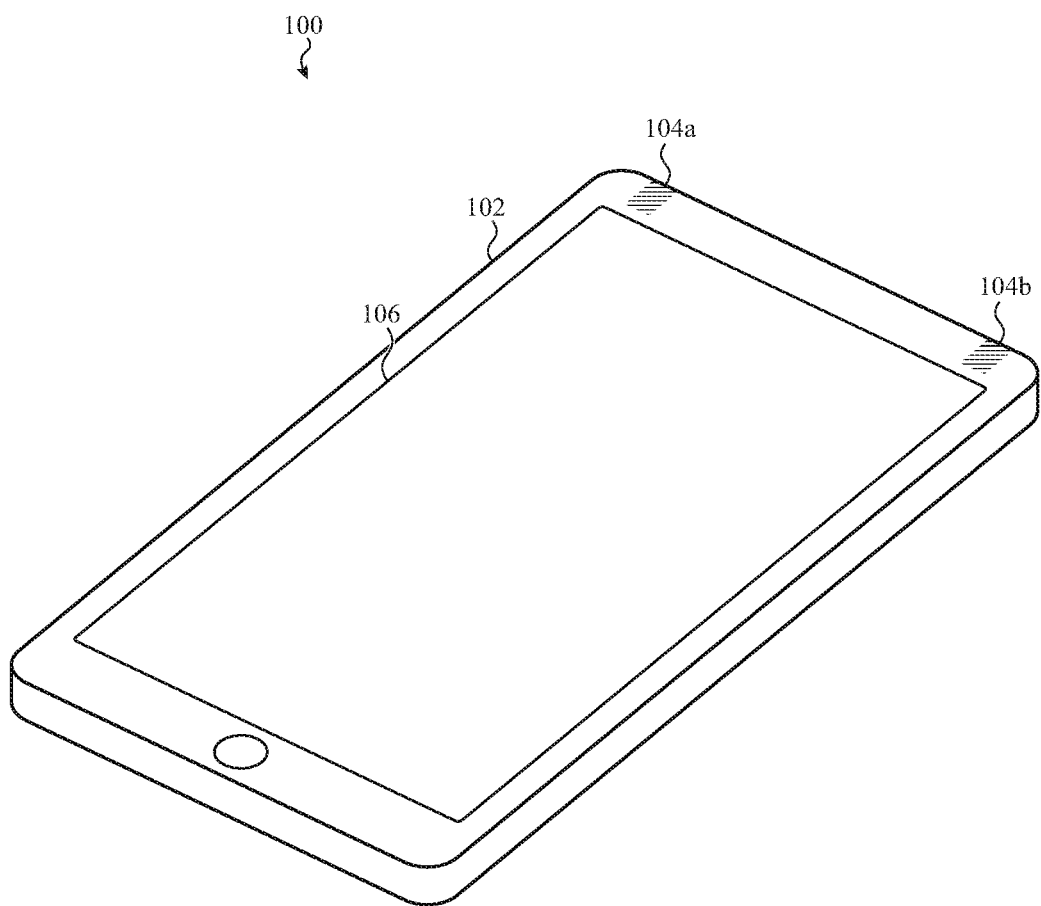
FIG. 1A illustrates a first example of a mobile telecommunication device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Various embodiments described herein are directed to mobile telecommunication devices (MTDs) and methods of their operation as part of a cellular telecommunication network. Examples of MTDs include mobile phones, electronic watches, tablet computers, laptop computers, and other types of devices that are capable of wireless communications with a cellular telecommunication network. The cellular telecommunication network may operate to provide telecommunication services to MTDs. Examples of such services include voice, data, video, radio, television, and other communications sent wirelessly to the MTDs. The cellular telecommunication network may further communicate with the internet or other networks, either through physical or wired connections, or wirelessly using electromagnetic radiation (e.g., radio frequency (RF) electromagnetic radiation).

The cellular telecommunication network may use one or more various wireless transmission and reception technologies, referred to herein as "wireless communication services," as part of a telecommunication link with an MTD. Examples of such transmission and reception technologies include older 2G and 3G technologies (such as GSM, UMTS, CDMA200), more recent technologies such as 4G systems (such as LTE based systems, and the like), and yet more recent 5G systems. Such wireless communication services may not be interoperable, due to different frequency bands used and different radio signaling formats (such as orthogonal frequency division multiple access (OFDMA) versus code division multiple access (CDMA) and related spread-spectrum technologies). Further, the various wireless communication services may have different power usages. As a result, some MTDs may include multiple wireless transceivers so that a user's MTD may make use of a more widely deployed but less recent cellular wireless communication service while still being able to make use of a newer but less widely deployed but more capable cellular wireless communication service.

For an MTD to be able to move or "roam" between the individual cells of a cellular telecommunication network, the wireless transceivers must be powered and active to make and switch connections with base station transceivers of the cellular telecommunication network. The wireless transceivers may attempt to make such connections by regularly transmitting "ping" or "beacon" signals that may cause a base station's transceiver to become aware of the presence of the MTD, and to initiate methods or protocols to establish the connection to the cellular telecommunication network. But maintaining activation of multiple wireless transceivers may unacceptably reduce available charge on a battery of an MTD. A further drain on a battery may occur if a wireless transceiver is maintained in its activated state (e.g., at full power usage for reception and transmission) in a location in which there is no coverage by the wireless communication service with which it is configured to operate. However, a wireless transceiver may need to stay activated in order to establish a telecommunication link with its wireless communication service as soon as the MTD moves into a location where the wireless communication service is available.

Power usage could be reduced if methods were available to turn off or reduce power usage by a wireless transceiver of the MTD in locations in which its corresponding wireless communication service is not available, or when the MTD would find it more advantageous to use an alternate wireless communication service to establish a telecommunication link. Such methods would, however, need to be able to reactivate a wireless transceiver when its corresponding wireless communication service again becomes available or desired.

Embodiments are described herein for methods and devices that may so activate and deactivate wireless transceivers according to the availability of corresponding wireless communication services. One aspect for such methods and devices involves obtaining a current location of the MTD and accessing a record of wireless communication services available in a local area about that current location, and accordingly activating a wireless transceiver only if its corresponding wireless communication service is one of the listed as available in the local area.

The current location may be obtained, in one embodiment, by first activating a GPS receiver, which may use less power than an activated wireless transceiver, and obtaining the location of the MTD. The MTD may then access a record of wireless communication services available in the local area that is stored in a memory of the MTD, and activate a wireless transceiver for an available wireless communication service. The MTD may use the activated wireless transceiver to establish a telecommunication link via the wireless communication service between the MTD and the cellular telecommunication network.

The MTD may also monitor its movements to detect entry from the local area to an alternate area, such as during roaming. The MTD may then access the record of wireless communication services to determine a revised listing of available wireless communication services for the alternate area. The MTD may then activate additional or alternative wireless transceivers as needed, and may deactivate a wireless transceiver for which there is no corresponding wireless communication service in the alternate area. The MTD may maintain one or more wireless transceivers operating in a beacon signaling mode to determine which wireless communication services are, or are not, available in the areas into which the MTD moves. These determinations can be used by the MTD to update its record of wireless communication services. The updated record may also be transmitted to a cellular telecommunication network for the cellular telecommunication network to use to update its own record of wireless communication services.

In another method, the MTD may first activate one wireless transceiver configured to operate with a first wireless communication service that is known to be available, or likely to be available. Such a wireless transceiver may use less power than others on the MTD. The MTD may then be able to establish a first telecommunication link with the cellular telecommunication network via the first wireless communication service. The current location of the MTD may then be obtained from information provided by the cellular telecommunication network. The MTD may then use the current location and the record of wireless communication services to select one or more wireless transceivers to activate to establish additional or alternative telecommunication links to the cellular telecommunication network.

These and other embodiments are discussed in further detail below with reference to FIGS. 1A-8. However, those skilled in the art will readily appreciate that the detailed description given herein with respect to these figures is for explanatory purposes only and should not be construed as limiting.

FIG. 1A illustrates a first example of a mobile telecommunication device, the mobile phone 100, that may use the methods of operation described below. The mobile phone 100 includes a housing 102 that contains the needed electronic components, such as one or more processors, memory (which may use either or both of non-volatile or volatile storage media), one or more radio receivers, transmitters, or transceivers, and other components. The mobile phone 100 also includes a display 106 on which images, icons for providing inputs and initiating programs, and other types of information may be presented to a user.

The housing 102 may have antennae sections 104a-b that provide reception and/or transmission capability for the one or more radio receivers, transmitters, or transceivers. The antennae sections 104a-b may be electrically separated from the housing. The various types of configurations for the housing 102 and the antennae sections 104a-b will be known to one skilled in the art.

The mobile phone 100 may include multiple radio receivers, transmitters, or transceivers to enable access to various wireless communication services, not all of which may be available in certain locations. As an example, the mobile phone may include a Global Positioning System (GPS) receiver system to obtain a current accurate location. Such a GPS receiver would not be configured for transmission. In contrast, the mobile phone 100 may also include at least one antennae and transceiver subsystem configured to both transmit and receive using a particular cellular telecommunication technology, hereinafter a "wireless communication service," such as a 2G or 3G system (e.g., GSM, UMTS, or CDMA2000), a 4G system (e.g., LTE, LTE Advanced, and the like), a 5G system (5G new radio), or other cellular telecommunication technology. Because the various wireless communication services may not be compatible, or for greater efficiencies if implemented separately, the mobile phone 100 may include multiple antennae and transceiver subsystems.

Figure 1B:
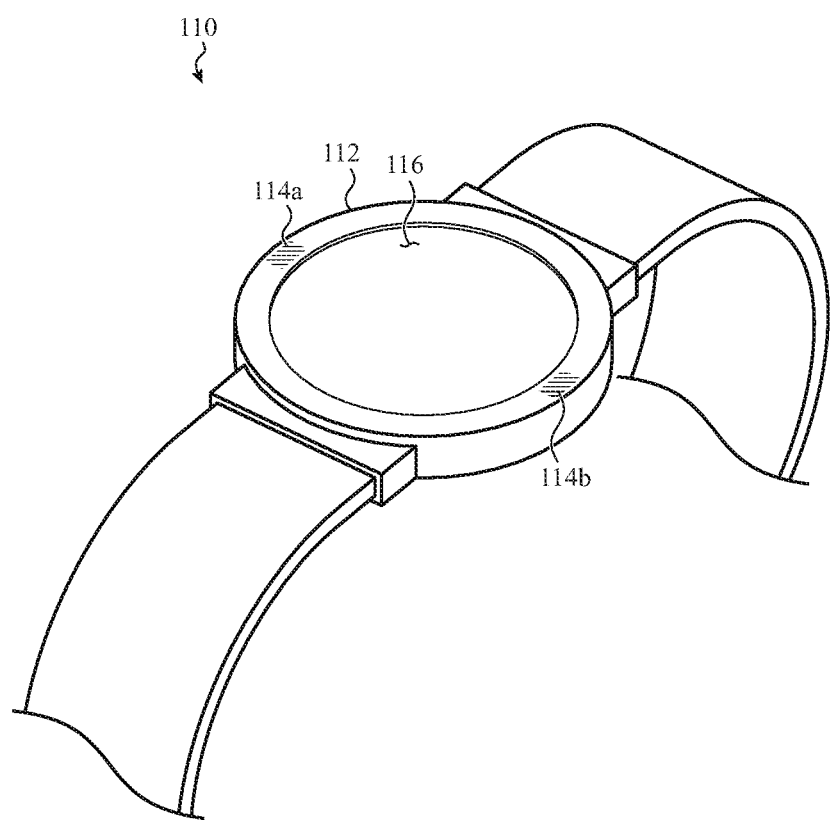
FIG. 1B illustrates a second example of a mobile telecommunication device.

FIG. 1B illustrates a second example of a mobile telecommunication device, the smart watch 110, that may use the methods of operation described below. The smart watch 110 may include a housing 112 that contains its various internal components and subsystems such as one or more processors, memory (either or both of non-volatile or volatile), one or more radio receivers, transmitters, or transceivers, and other components. The smart watch 110 may include a display 116 on which images, icons for providing inputs and initiating programs, and other types of information may be presented to a user. The display 116 may form a section of the housing 112, or be sealed into the housing 112.

The housing 112 may have antennae sections 114a-b that provide reception and/or transmission capability for one or more radio receivers, transmitters, or transceivers. The antennae sections 114a-b may be electrically separated from the housing. The various types of configurations for the housing 112 and the antennae sections 114a-b will be known to one skilled in the art.

The smart watch 110 may include multiple transceivers configured to operate with one or more wireless communication services, as described above for the mobile phone 100.

The two examples of mobile telecommunication devices described in FIGS. 1A-B are exemplary; other mobile telecommunication devices, such as those previously stated, may use the methods of operation described below. For simplicity of explanation, hereinafter "transceiver" will refer to a system capable of receiving an electromagnetically transmitted signal, transmitting such a signal, or both. In such a system configured for both receiving and transmitting, the receiver and transmitter sections may either be implemented together as a combined unit, or may be implemented as separate subsystems. When needed for clarity, a system configured for only one of reception or transmission will be so described. Further, a transceiver system may be configured to operate with more than one wireless communication services.

Figure 2:
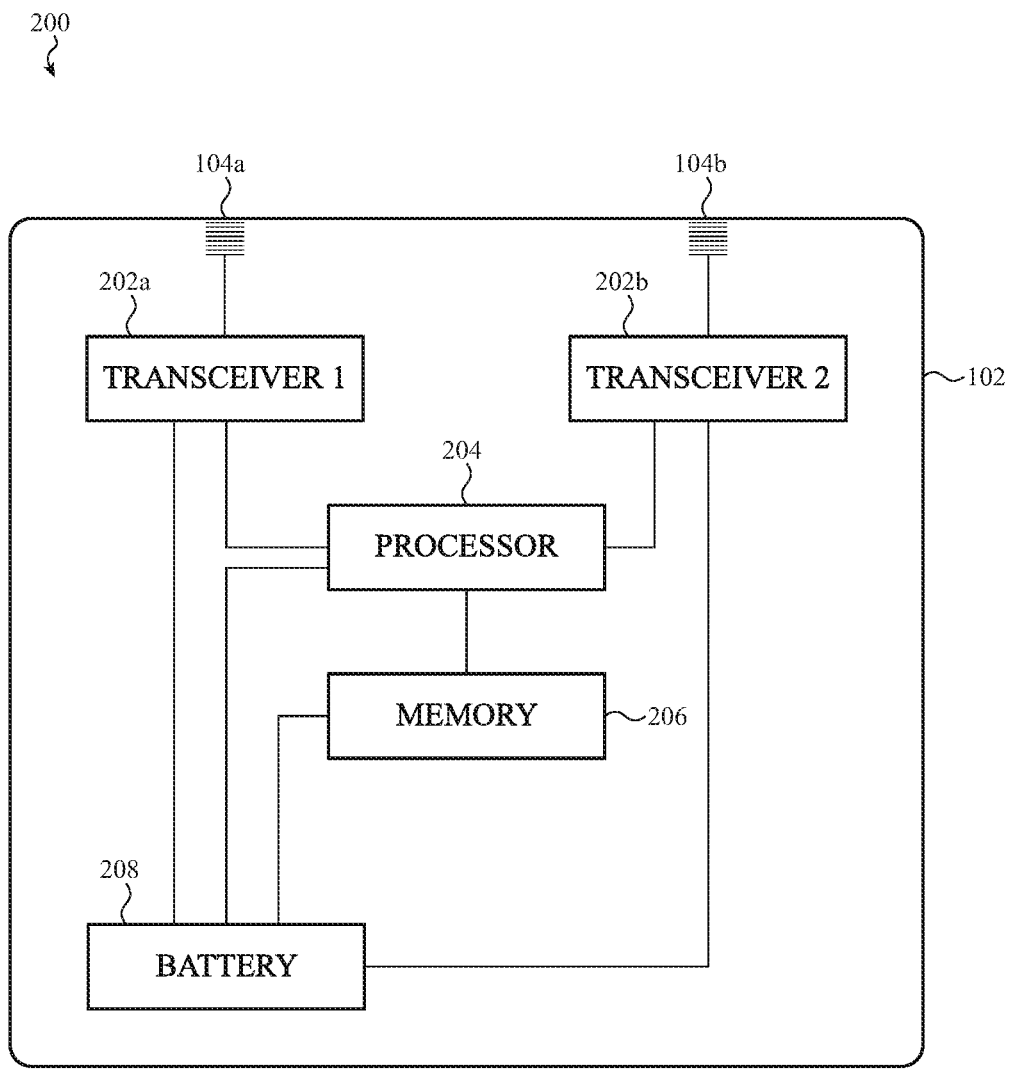
FIG. 2 shows a block diagram of components of a mobile telecommunication device, according to an embodiment.

FIG. 2 illustrates a block diagram 200 of various components or subsystems that may be included as part of a mobile telecommunication device, such as either the mobile phone 100, the smart watch 110, or another mobile telecommunication device. For explanatory purposes, inn FIG. 2, the block diagram 200 shows the components and subsystems of the mobile phone 100 of FIG. 1A contained within the housing 102. The mobile phone 100 includes a first transceiver 202a and a second transceiver 202b. The two transceivers 202a-b may be configured to operate with different respective wireless communication services. As an example, transceiver 202a may be configured to operate with a 4G cellular telecommunication network, whereas transceiver 202b may be configured to operate with a 5G cellular telecommunication network. The transceivers 202a-b may include modulators and demodulators to convert electromagnetic wave signals received at antennae 104a-b into baseband signals, and convert baseband signals into transmitted electromagnetic wave signals. The transceivers may also perform other operations, such as signal filtering, noise reduction, channel selection, and the like.

The processor 204 is communicatively linked with the two transceivers 202a-b. The processor 204 may serve to control the transceivers to receive and transmit electromagnetic signals to and from a cellular telecommunication network using a selected wireless communication service. The processor 204 may include multiple computational and processing components, such as microprocessors, FPGAs, signal processors and generators, and the like. The processor may be implemented as a single integrated circuit, such as an application specific integrated circuit, or as multiple integrated circuits.

The processor 204 may be connected to a memory 206, which may be implemented with a volatile storage medium (such as dynamic RAM) or non-volatile storage medium, either magnetic or semiconductor based (such as disk, ROM, static RAM, and the like). A non-transitory, non-volatile part of the memory 206 may store instructions that, when executed by the processor 204, cause the processor 204 to control either or both of the transceivers 202a-b according to any of the methods described below.

The battery 208 may be connected to the memory 206, the processor 204, and the transceivers 202a-b to provide the needed electrical power for their respective operations. The battery 208 may be implemented using lithium ion or another battery technology.

Figure 3:
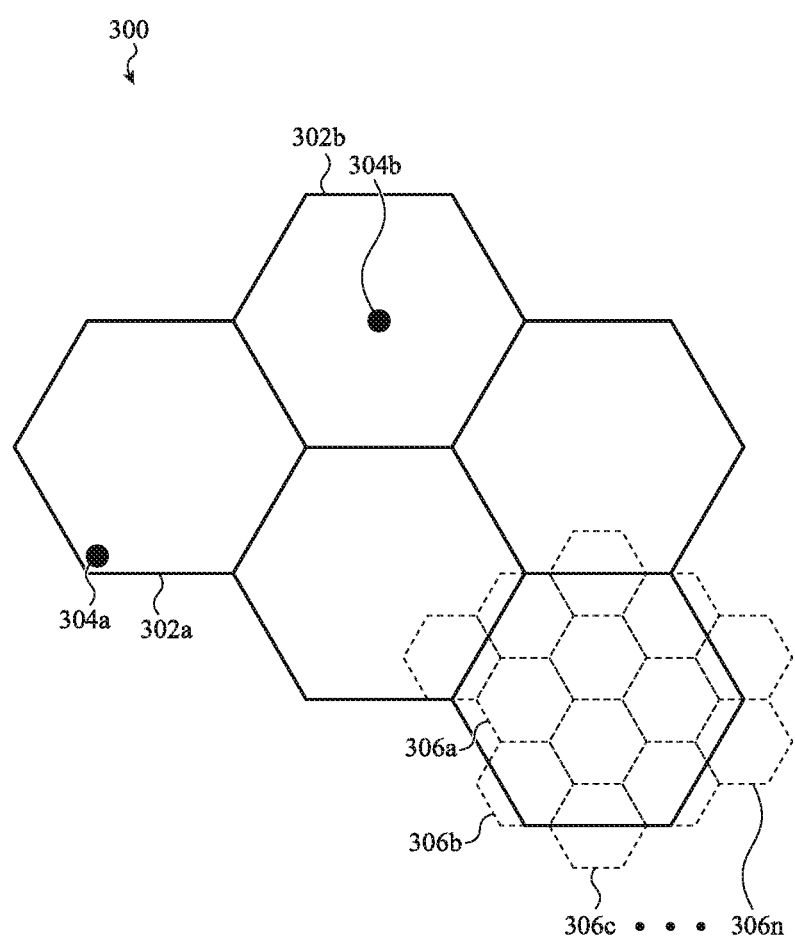
FIG. 3 illustrates cell patterns of two wireless communication services, according to an embodiment.

FIG. 3 illustrates a partial arrangement 300 of cells of a cellular telecommunication network in geographical area. One skilled in the art will recognize that a cellular telecommunication network may provide a large number of cells over a wide geographical area. While the cells shown are hexagonal, the cellular telecommunication network may use cells of other configurations. The shown partial arrangement 300 is for explanatory purposes only and should not be construed as limiting.

The partial arrangement 300 includes two sizes of cells, corresponding to respective wireless communication services. For example, the larger cells, such as cells 302a and 302b may represent cells of a 4G wireless communication service. The cells 302a-b may provide service through respective base stations 304a and 304b. The base stations may be located either on a boundary of a cell to provide directional coverage, as for base station 304*a* in cell 302*a*, or centrally to provide omnidirectional coverage, as for base station 304*b* in cell 302*b*.

The smaller network cells 306*a-n* may, for example, be part of a 5G wireless communication service, such as may provide local high data rate services for a plaza or downtown area. As noted previously, cells of a 5G wireless communication service are often smaller than cells of a 4G or earlier generation wireless communication service. In the exemplary partial arrangement 300, several such 5G cells may be needed to cover the area of a single 4G cell.

As noted previously, different wireless communication services may require different transceivers due to different frequency bands used and different signaling methods. To initiate or maintain a telecommunication link, a mobile phone or other MTD may activate a wireless transceiver to receive an electromagnetic signal from, or broadcast such a signal to, a base station of a cell. Such activation can cause an undesirable drain on a battery of the MTD if the MTD is not in a cell providing the wireless communication service with which the wireless transceiver can operate. For those MTDs incorporating multiple wireless transceivers, there can be an even greater drain on the battery if the wireless transmitters are activated to transmit or receive signals intended to determine if a wireless communication service is available. Such issues are addressed by the methods described below.

Figure 4:
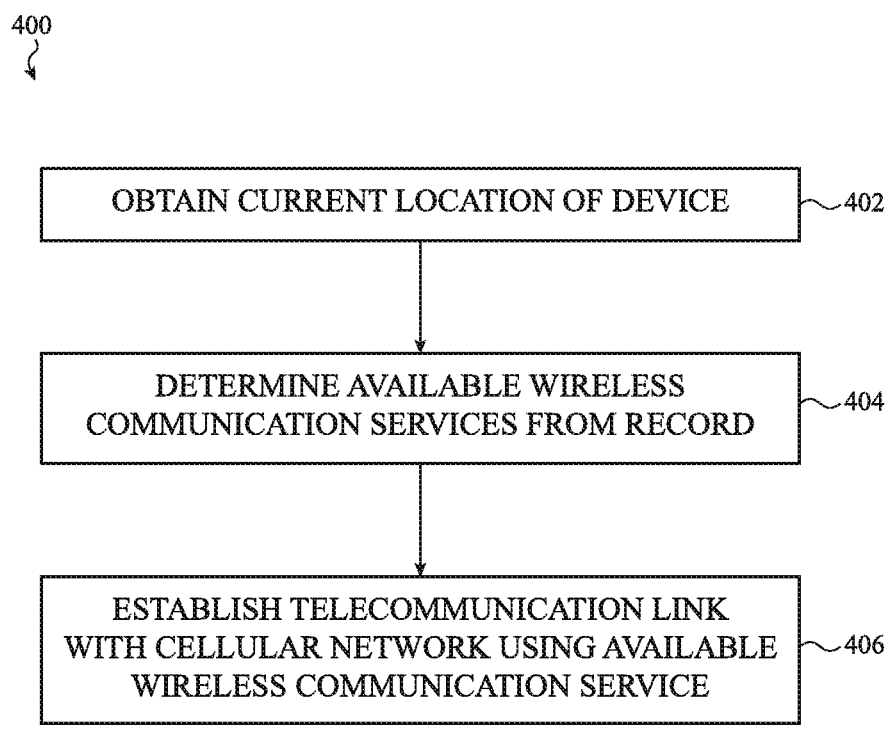
FIG. 4 is a flow chart of a method of operation of a mobile telecommunication device, according to an embodiment.

FIG. 4 is a flow chart of a method 400 of operating a mobile telecommunication device (MTD). One goal of the method 400 is to reduce power consumption of its wireless transmitters by determining availability of wireless communication service before activation of a wireless transceiver.

At block 402, the MTD obtains its current location. The MTD may do so, for example, as part of being turned on, after a loss of any or all telecommunication links, periodically after quiescent operation, or the like. The position may be obtained using one or more of various methods. A first method of obtaining the location includes activating a Global Positioning System receiver of the MTD before activating a wireless transceiver configured to operate with a wireless communication service. Using a GPS receiver to obtain the location may use less power than activating a wireless transceiver to search for an available wireless communication service, which may require both signal reception and transmission by the wireless transceiver.

An additional and/or alternative method of obtaining the location that the MTD may use is to activate a first wireless transceiver configured to operate at lower power with a first wireless communication service than a second wireless transceiver, and obtain a location from the first wireless communication service. For example, an MTD incorporating both a 4G wireless transceiver and a 5G wireless transceiver may initially activate only the 4G wireless transceiver, such as in a receive-only mode, to attempt to obtain its current location.

At block 404, using the obtained current location, the MTD may access a record of wireless communication services (or simply "record"). The record of wireless communication services may be stored on the MTD itself, such as in a memory that is accessed by a processor implementing or coordinating the method 400. Accessing the record may be implemented using an Application Program Interface running on the processor. An alternate method of accessing a record of wireless communication services will be described below with respect to FIGS. 7-8.

The record of wireless communication services may, using the obtained current location, provide (such as to the processor) a listing of wireless communication services available in a local area of the current location. The local area may range in size from a single cell of an available wireless communication service to a region (e.g., city, county, or even state). A small local area may allow the processor to determine only wireless communication services that are immediately available to the MTD, whereas a larger local area may allow the processor to plan for movement of the MTD. The size of the local area may be variable and provided as part of accessing the record. The listing of wireless communication services available in the local area may include identifiers of one or more cells of available wireless communication services that can link with a wireless transceiver of the MTD, and may include other information.

At block 406, the MTD uses the information in the listing of wireless communication services available in a local area to select one or more of the available wireless communication services with which to establish a telecommunication link to a cellular telecommunication network providing the wireless communication service. The MTD may then activate the corresponding one or more wireless transceivers and establish the telecommunication link.

As an example, the accessed record may list that only a 4G service is available in a local area, such as a few miles around the current location of the MTD. In this case, the MTD could activate only a wireless transceiver for the 4G service while keeping quiescent (or off) a separate wireless transceiver configured to connect to a 5G service.

Figure 5:
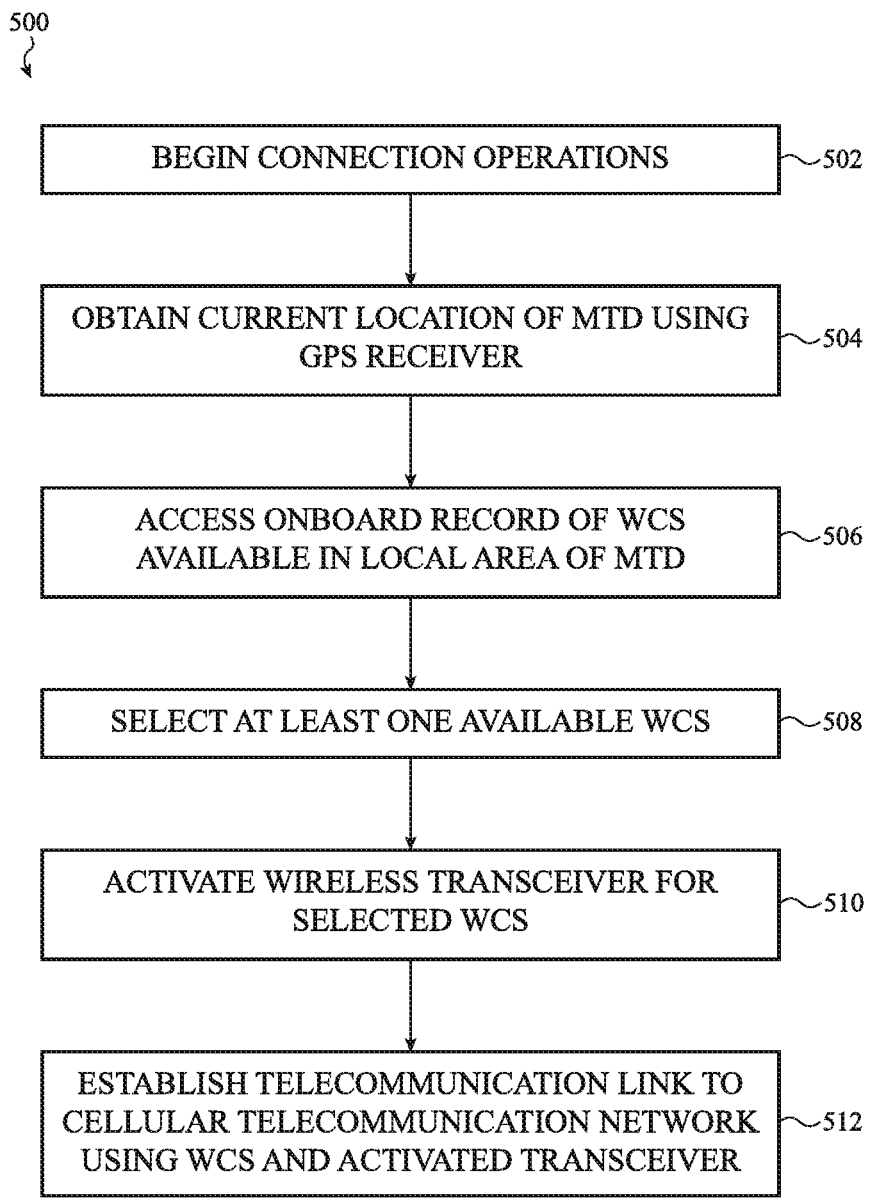
FIG. 5 is a flow chart of a method of location-based operation of a mobile telecommunication device, according to an embodiment.

FIG. 5 is a flow chart of a method 500 of operating an MTD similar to the method 400.

At block 502, the MTD begins connection operations. This may occur as the MTD is turned on, is brought out of a quiescent state, when the MTD has lost a previously active telecommunication link, or the like. To conserve battery power, the MTD may keep or put one or more wireless transceivers in an off or quiescent state.

At block 504, the MTD (or the processor implementing or coordinating the method 500) may obtain its current location using a GPS receiver. Another method of obtaining the current location may also be used.

At block 506, a record of wireless communication services available in a local area of the obtained current location is accessed. The record may be stored in a memory, such as a non-volatile or non-transitory memory, of the MTD. As described previously, the local area may vary in size, and may be provided by the MTD as part of accessing the record. The record may provide a listing of wireless communication services available in the local area.

At block 508, the MTD may select at least one available wireless communication service with which to establish a telecommunication link to a cellular telecommunication network providing the wireless communication service. As an example, if the listing states that both 4G and 5G wireless communication services are available in the local area, the MTD may select both, in order to have rapid voice and data transmissions to and from the cellular telecommunication network.

At block 510, the MTD may activate the one or more wireless transceivers for the selected wireless communication services.

At block 512, one or more telecommunication links are established with the cellular telecommunication network using the activated wireless transceivers.

In additional and/or alternative methods, the MTD may determine that the record of wireless communication services stored in its memory is not up to date. This may be determined by the MTD accessing, over a telecommunication link, a website provided by the cellular telecommunication network, or by another process. The MTD may then download and store an updated record. Such an updating operation may be performed automatically, such as at regular intervals or when signaled by the cellular telecommunication network, or by a user input command to the MTD. For example, before traveling to a distant state, a user of the MTD may cause the MTD to download a record of wireless communication services available throughout the state.

Figure 6:
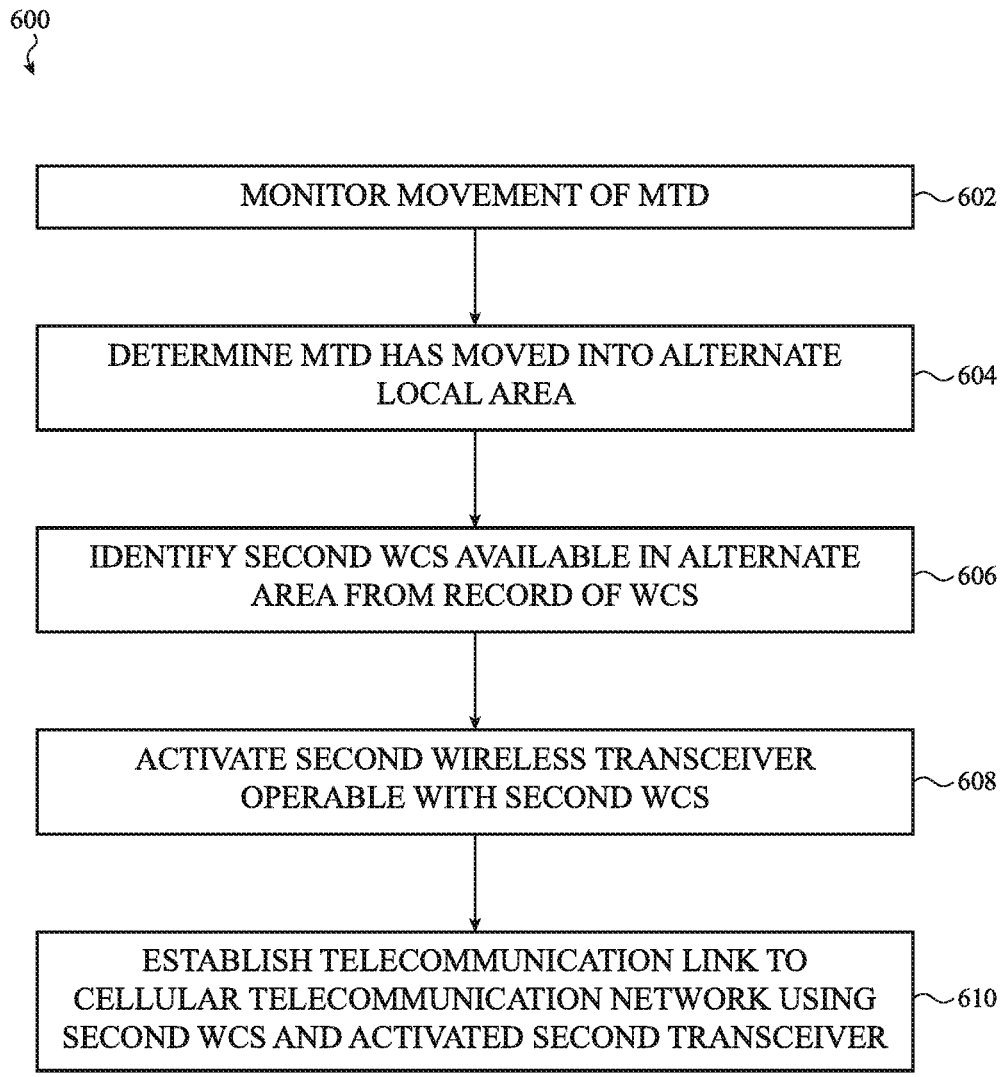
FIG. 6 is a flow chart of a further method of location-based operation of a mobile telecommunication device, according to an embodiment.

FIG. 6 is a flow chart of a method 600 that extends the method 500 of FIG. 5. Alternatively, the method 600 may be used separately. The method 600 describes operations that may be used by an MTD after a first telecommunication link between the MTD and a cellular telecommunication network has been established, and an initial location or local area of the MTD has been determined.

At block 602, movement of the MTD is monitored. This may be performed using an activated GPS receiver, an accelerometer, signals received over the first telecommunication link, or other methods.

At block 604, a determination is made that the MTD has moved from an initial local area or cell into an alternate local area. The alternate local area may be an adjoining cell, or a larger area. Various possibilities for the first telecommunication link of the MTD may occur. The MTD may be able to continue using the first telecommunication link, as the corresponding wireless communication service is still available in the alternate local area (such as in a hand off between base stations of cells). The first telecommunication link may continue to be available and a second wireless communication service may be determined to be operating in the alternate local area.

At block 606, the MTD may identify a second wireless communication service that is available in the alternate local area. The identification may be performed by accessing the record of wireless communication services or by a signal received over the operating first telecommunication link, or by another method.

The activation of the second wireless transceiver may be performed by the MTD even without having already identified a second wireless communication service available in the alternate local area. Any activation of a wireless transceiver may include having the wireless transceiver transmit an initial short message using a wireless communication service for which it is configured, to elicit a response from the cellular telecommunication network, such as from a base station transceiver. Transmission of such an initial short message to elicit a response will be referred to herein as "pinging," "beacon signaling" or just "beaconing." The reply response from the cellular telecommunication network may transmit information to the MTD, such as information regarding the availability of the second wireless communication service in the alternate local area. Beaconing may be performed "blind" by a wireless transceiver at a periodic time interval without the MTD having determined the availability of a wireless communication service with which the wireless transceiver may be configured to operate. If there is no received response from the cellular telecommunication network, the wireless transceiver may enter a quiescent or off state.

Alternatively, one or both of the wireless transceivers may be continue in operation and use beacon signaling to determine if a wireless communication service is or becomes available in the alternate local area or in a subsequent local area. In either case, the MTD may use the determination of available wireless communication services to update its stored record of available wireless communication services. In this way the MTD can 'learn' a map or record of wireless communication services. The MTD may also transmit such an updated record to the cellular telecommunication network so that the cellular telecommunication network can update a centrally stored record of wireless communication services, such as for transmission to other users' MTDs.

At block 608, the MTD may, based on the identification of the second wireless communication service available in the alternate local area, activate a second wireless transceiver configured to operate with the second wireless communication service.

At block 610, the MTD may establish a second telecommunication link on the second wireless communication service between the MTD and the cellular telecommunication network using the activated second wireless transceiver.

As an example of how method 600 may be used, an MTD may be originally located in the cell 302a of FIG. 3, which may be part of a 4G cellular telecommunication network, and may establish a first 4G telecommunication link to that 4G network. The MTD may move into the area covered by the 5G network cells 306a-n while maintaining the 4G link (such as by hand offs between base stations of the 4G cells). The MTD may then identify (such as by accessing the record of wireless communication services) that 5G service is now available. The MTD may now activate its 5G wireless transceiver to establish a 5G telecommunication link to the cellular telecommunication network. The MTD may either maintain the original 4G telecommunication link to obtain increased voice or data rates, or may deactivate it to rely solely on the 5G telecommunication link to save battery power.

Figure 7:
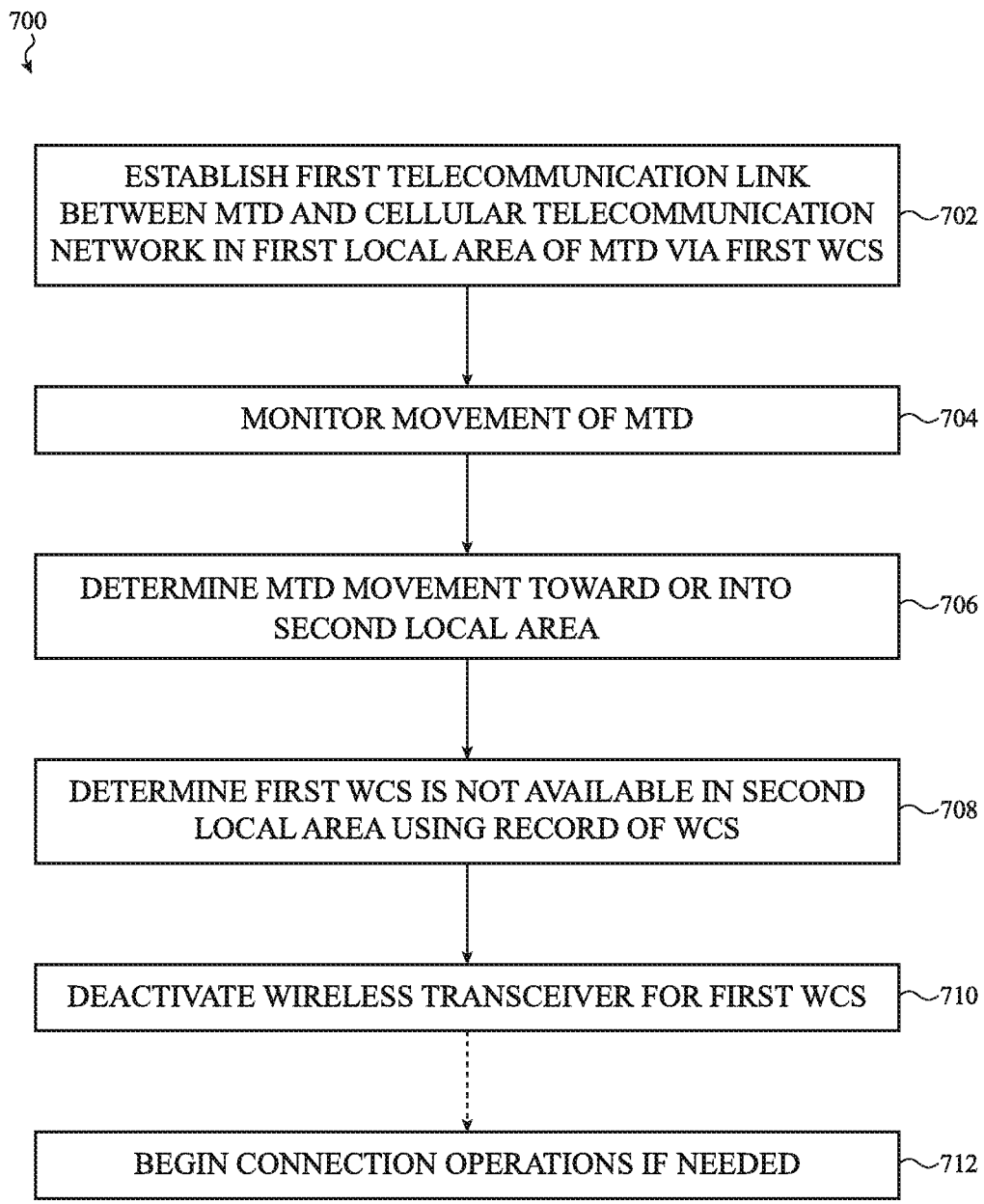
FIG. 7 is a flow chart of a method of operation of a mobile telecommunication device, according to an embodiment.

FIG. 7 is a flow chart of a method 700 of operating an MTD that extends the method 500 of FIG. 5. Alternatively, the method 700 may be used separately. The method 700 includes operations that may be used by an MTD that undergoes movement.

At block 702, the MTD establishes a first telecommunication link with a first wireless communication service between the MTD and a cellular telecommunication network. The link may be established as in method 500 by obtaining a first location of the MTD, accessing a record of wireless communication services available in a first local area of the first location, activating a first wireless transceiver for an available first wireless communication service, and establishing the first telecommunication link using the activated first wireless transceiver.

At block 704, movement of the MTD may be monitored and movement of the MTD from the first local area is detected. The MTD may detect its movement using a GPS receiver system, a signal received over the first telecommunication link, or by another method.

At block 706, the MTD may determine that its movement is toward or into a second local area. By determining motion toward the second local area, an MTD may activate or "warm up" a second wireless transceiver and/or other components in anticipation or preparation for entering the second local area.

At block 708, the MTD may determine that the first wireless communication service is not available in the second local area. This determination may be performed by accessing the record of wireless communication services or by a signal received over the first telecommunication link.

At block 710, once the MTD enters the second local area, the MTD may deactivate the first wireless transceiver to conserve battery power. At block 712, the MTD may begin connection operations, if needed or desired, to establish another telecommunication link.

Figure 8:
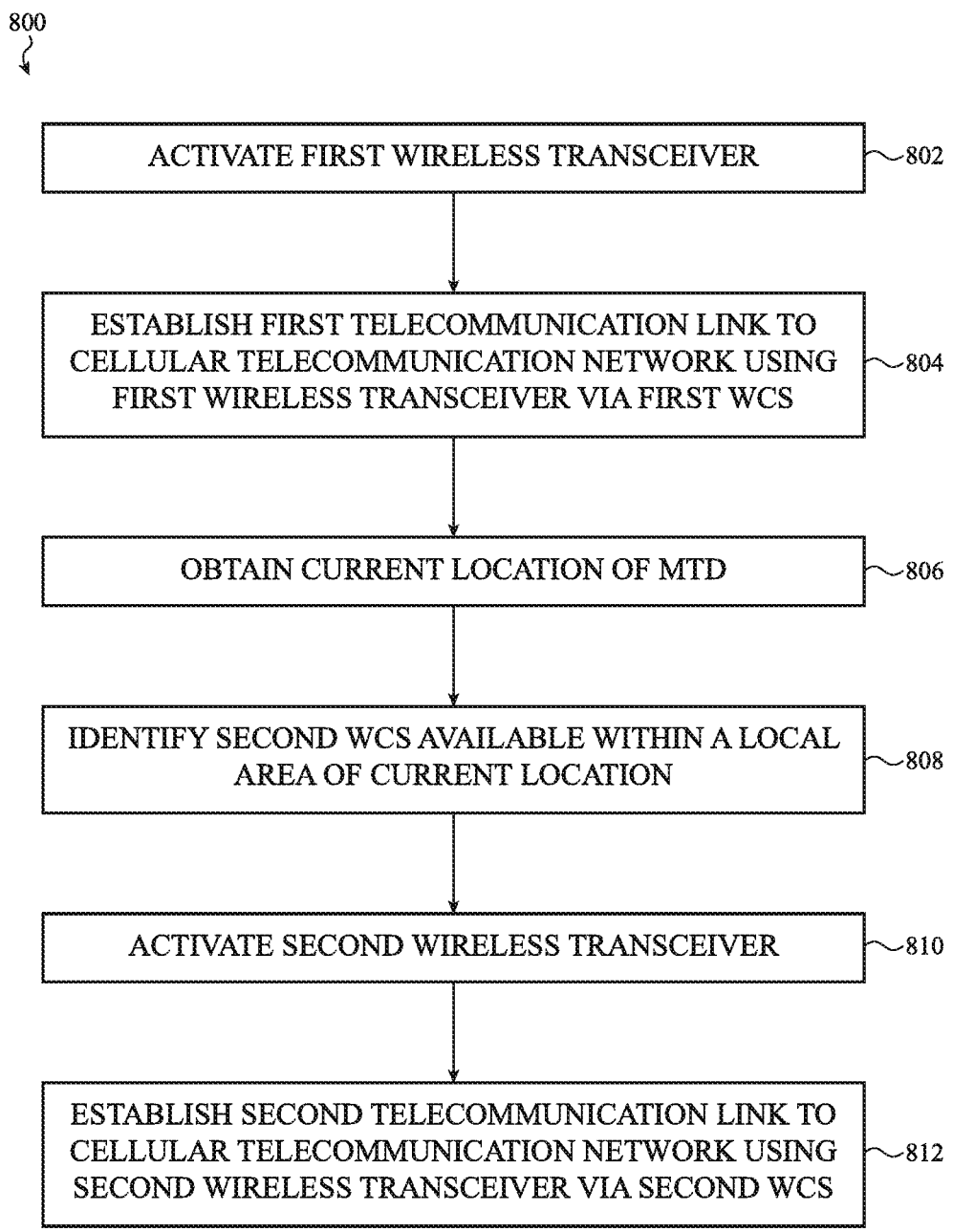
FIG. 8 is a flow chart of another method of operation of a mobile telecommunication device, according to an embodiment.

FIG. 8 is a flow chart of a method 800 of operating a mobile telecommunication device (MTD). The method 800 may be used by an MTD in situations in which it is known or likely that a first cellular telecommunication network will be available in a local area of the current location of the MTD.

At block 802, the MTD activates a first wireless transceiver configured to operate with a first wireless communication service. The MTD may perform the activation when being turned on, or returning from a quiescent state (e.g., a sleep mode). The MTD may perform the activation using information about its location prior to being turned off or put into the quiescent state. If that prior information indicates that a first wireless communication service was available at the location, the MTD may activate the corresponding first wireless transceiver for that first wireless communication service. The MTD may activate only a receiver section of the first wireless transceiver to conserve battery power while the receiver section is used to detect if the first wireless communication service is still available. If so, the MTD may then activate the first wireless transceiver as a whole. This may obviate the need to activate and use a GPS receiver initially to obtain a location of the MTD.

At block 804, in the case that the first wireless communication service is determined to be available, the MTD may establish a first telecommunication link via the first wireless communication service between the MTD and the cellular telecommunication network.

At block 806, using the method 800, the MTD may obtain its current location by using the established first telecommunication link with the cellular telecommunication network. For example, as part of establishing the first telecommunication link, signals received from the cellular telecommunication network by the first wireless transceiver may contain information regarding a location of the originating base station, and information regarding a current location of the MTD itself. The current location of the MTD may be determined by the cellular telecommunication network using the strength of the first wireless transceiver's signal, directional reception used by the base station, or other methods.

At block 808, the MTD may identify a second wireless communication service available within a local area of the MTD. As before, the MTD may vary in area and be selected based on factors such as signal strength and type of the first wireless communication service, a known size or range of a stored record of wireless communication services that might be available, and the like. For example, the MTD may receive information that its current location is near an intersection of three cells of the first wireless communication service. In order to plan for motion through multiple cells of the cellular telecommunication network, the method may choose a large local area in which to search for, or identify, a second wireless communication service.

The method may access a stored record of wireless communication services to identify the second wireless communication service available within the local area of the MTD. Additionally or alternatively, the MTD may use the first telecommunication link to the cellular telecommunication network to access an internet webpage to obtain a listing of wireless communication services available within the local area of the MTD. The listing may identify one or more wireless communication services available within the local area of the MTD. The MTD may then select at least one wireless communication service from the listing as the second wireless communication service to be used. Selection criteria may include signal strength, potential data rate, present charge on the battery, or other criteria.

At block 810, the MTD may activate a second wireless transceiver configured to operate using the identified second wireless communication service. At block 812, the MTD may establish a second telecommunication link, via the activated second wireless communication service, between the MTD and the cellular telecommunication network.

The MTD may then either continue using the first established telecommunication link, or deactivate the first wireless transceiver to discontinue the first established telecommunication link. Continuing to use the first established telecommunication link can allow for greater data speeds received at the MTD from the cellular telecommunication network, whereas switching to using only the second established telecommunication link may reduce power usage.

A particular operation or action performed within one of the methods described in relation to FIGS. 4-8 is not to be construed as limited only to that respective method, and may be combined or used as part of any of the other methods.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of operating a mobile telecommunication device (MTD), comprising:
   in response to the MTD turning on or returning from a quiescent state and before activating any wireless transceiver configured to operate with a terrestrial cellular wireless communication service, accessing locally stored information indicating,
      a location of the MTD prior to the MTD turning off or entering the quiescent state; and
      a first terrestrial cellular wireless communication service known to be available at the location;
   after accessing the locally stored information and before activating any other wireless transceiver configured to operate with a terrestrial cellular wireless communication service, activating a first wireless transceiver configured to operate with the first terrestrial cellular wireless communication service;

using the activated first wireless transceiver to establish a first telecommunication link via the first terrestrial cellular wireless communication service;

obtaining, by the MTD and via the first telecommunication link, a current location of the MTD;

accessing a record of wireless communication services;

selecting, based on the record of wireless communication services, a second terrestrial cellular wireless communication service available within a local area of the current location of the MTD;

activating a second wireless transceiver of the MTD configured to operate with the second terrestrial cellular wireless communication service; and using the second wireless transceiver to establish a second telecommunication link via the second terrestrial cellular wireless communication service.

2. The method of claim 1, wherein:
the record of wireless communication services is stored on the MTD; and
the record of wireless communication services provides a listing of wireless communication services available in the local area of the MTD.

3. The method of claim 2, further comprising:
accessing, using the first telecommunication link or the second telecommunication link, a storage site separate from the MTD;
obtaining an updated record of wireless communication services from the storage site; and
storing the updated record of wireless communication services on the MTD.

4. The method of claim 1, further comprising:
identifying, based on the record of wireless communication services, a third wireless communication service within the local area of the current location of the MTD;
activating a third wireless transceiver of the MTD configured to operate with the third wireless communication service; and
using the third wireless transceiver to establish a third telecommunication link via the third wireless communication service.

5. The method of claim 1, comprising:
monitoring movement of the MTD;
determining that the MTD has moved from the local area into an alternate area;
identifying a third wireless communication service available in the alternate area;
when the third wireless communication service is different from the first terrestrial cellular wireless communication service and the second terrestrial cellular wireless communication service, activating a third wireless transceiver of the MTD; and
using the third wireless transceiver to establish a third telecommunication link via the third wireless communication service.

6. The method of claim 5, wherein activating the third wireless transceiver of the MTD includes beaconing by the third wireless transceiver.

7. The method of claim 5, further comprising:
accessing the record of wireless communication services to obtain a listing of wireless communication services available in the alternate area; wherein:
the record of wireless communication services is stored on the MTD.

8. The method of claim 5, wherein:
the alternate area is a first alternate area; and
the method further comprises:

determining that the MTD has moved from the first alternate area into a second alternate area;
determining that the third wireless communication service is not available in the second alternate area; and
deactivating the third wireless transceiver on the MTD.

9. The method of claim 1, wherein activating the first wireless transceiver comprises:
initially activating a receiver section of the first wireless transceiver;
detecting the first terrestrial cellular wireless communication service using the receiver section; and
activating a transmitter section of the first wireless transceiver after detecting the first terrestrial cellular wireless communication service.

10. An electronic device, comprising:
a set of wireless transceivers configured to operate with at least one wireless communication service;
a processor communicatively linked to the set of wireless transceivers; and
a non-transitory storage medium communicatively linked with the processor and storing instructions that, when executed by the processor, cause the processor to:
in response to the electronic device turning on or returning from a quiescent state and before activating any wireless transceiver configured to operate with a terrestrial cellular wireless communication service, access locally stored information indicating,
a location of the MTD prior to the MTD turning off or entering the quiescent state; and
a first terrestrial cellular wireless communication service known to be available at the location;
after accessing the locally stored information and before activating any other wireless transceiver configured to operate with a terrestrial cellular wireless communication service, activate a first wireless transceiver of the set of wireless transceivers, the first wireless transceiver configured to operate with the first terrestrial cellular wireless communication service;
use the activated first wireless transceiver to establish a first telecommunication link via the first terrestrial cellular wireless communication service;
obtain a current location of the electronic device via the first telecommunication link;
access a record of wireless communication services to obtain a listing of wireless communication services available within a local area of the current location;
select, based on the record of wireless communication services, a second terrestrial cellular wireless communication service available within the local area of the current location;
activate a second wireless transceiver of the set of wireless transceivers, the second wireless transceiver configured to operate with the second terrestrial cellular wireless communication service; and
use the second wireless transceiver to establish a second telecommunication link via the second terrestrial cellular wireless communication service.

11. The electronic device of claim 10, wherein the record of wireless communication services is stored in the non-transitory storage medium of the electronic device.

12. The electronic device of claim 11, wherein:
the instructions further cause the processor to:
determine, using the listing of wireless communication services available within the local area, that a third wireless communication service is available within the local area of the current location of the electronic device;

activate a third wireless transceiver of the set of wireless transceivers, the third wireless transceiver configured to operate with the third wireless communication service; and use the third wireless transceiver to establish a third telecommunication link via the third wireless communication service.

13. The electronic device of claim 11, wherein:

the instructions further cause the processor to:

monitor movement of the electronic device;

determine that the electronic device has moved from the local area into an alternate area;

access the record of wireless communication services to obtain a listing of wireless communication services available in the alternate area;

determine that a third wireless communication service is available in the alternate area;

activate a third wireless transceiver of the set of wireless transceivers, the third wireless transceiver configured to operate with the third wireless communication service; and use the activated third wireless transceiver to establish a third telecommunication link via the third wireless communication service.

14. The electronic device of claim 13, wherein:

the alternate area is a first alternate area; and the instructions further cause the processor to:

determine that the electronic device has moved from the first alternate area into a second alternate area;

determine that the third wireless communication service is not available in the second alternate area by accessing the record of wireless communication services; and deactivate the third wireless transceiver on the electronic device.

15. The method of claim 10, wherein activating the first wireless transceiver comprises:

initially activating a receiver section of the first wireless transceiver;

detecting the first terrestrial cellular wireless communication service using the receiver section; and activating a transmitter section of the first wireless transceiver after detecting the first terrestrial cellular wireless communication service.

16. A method of operating a mobile telecommunication device (MTD) including a first wireless transceiver and a second wireless transceiver, the method comprising:

in response to the MTD turning on or returning from a quiescent state and before activating any wireless transceiver configured to operate with a terrestrial cellular wireless communication service, accessing locally stored information indicating, a location of the MTD prior to the MTD turning off or entering the quiescent state; and a first terrestrial cellular wireless communication service known to be available at the location;

after accessing the locally stored information and before activating any other wireless transceiver configured to operate with a terrestrial cellular wireless communication service, activating the first wireless transceiver, the first wireless transceiver configured to operate with the first wireless communication service;

using the activated first wireless transceiver to establish a first telecommunication link via the first terrestrial cellular wireless communication service;

obtaining, via the first telecommunication link, a current location of the MTD;

identifying a second terrestrial cellular wireless communication service available within a local area of the current location of the MTD;

activating the second wireless transceiver; and establishing a second telecommunication link via the second terrestrial cellular wireless communication service using the activated second wireless transceiver.

17. The method of claim 16, wherein:

identifying the second terrestrial cellular wireless communication service includes accessing a record of wireless communication services;

the record of wireless communication services is obtained from the first terrestrial cellular telecommunication network via the first telecommunication link; and the record of wireless communication services provides a listing of wireless communication services available in the local area of the current location of the MTD.

18. The method of claim 17, further comprising:

monitoring movement of the MTD;

determining that the MTD has moved from the local area into an alternate local area;

determining that the second terrestrial cellular wireless communication service is not available in the alternate local area; and deactivating the second wireless transceiver on the MTD.

19. The method of claim 16, wherein:

identifying the second terrestrial cellular wireless communication service includes accessing a record of wireless communication services; and the method further comprises:

monitoring movement of the MTD;

determining that the MTD has moved from the local area into an alternate local area;

determining, using beacon signaling from at least one of the first and second wireless transceivers, which of the first and second terrestrial cellular wireless communication services are available in the alternate local area; and updating the record of wireless communication services based on the determination.

* * * * *